United States Patent [19]

Shinoda et al.

[11] 4,037,233
[45] July 19, 1977

[54] EXPOSURE CONTROL DEVICE FOR A CAMERA

[75] Inventors: Nobuhiko Shinoda, Tokyo; Tadashi Ito; Fumio Ito, both of Yokohama; Yukio Mashimo, Tokyo; Nobuaki Sakurada, Yokohama, all of Japan

[73] Assignee: Canon Kabushiki Kaisha, Tokyo, Japan

[21] Appl. No.: 606,572

[22] Filed: Aug. 21, 1975

[30] Foreign Application Priority Data

Aug. 27, 1974 Japan ............................... 49-98660

[51] Int. Cl.² .............................................. G03B 7/08
[52] U.S. Cl. .................................. 354/23 D; 354/50; 354/60 A
[58] Field of Search ............... 354/23 D, 50, 51, 60 F, 354/60 A

[56] References Cited

U.S. PATENT DOCUMENTS

| | | | |
|---|---|---|---|
| 3,868,704 | 2/1975 | Yamada et al. | 354/23 D |
| 3,879,118 | 4/1975 | Kiyohara et al. | 354/23 D |
| 3,900,855 | 8/1975 | Stempeck | 354/23 D |
| 3,903,528 | 9/1975 | Kee | 354/23 D |

Primary Examiner—Russell E. Adams
Attorney, Agent, or Firm—Toren, McGeady and Stanger

[57] ABSTRACT

An exposure control device is disclosed which has an extremely high accuracy as compared with the prior art, the error range being within a one-eighth step. For such a highly accurate control of exposure time, a value of exposure time to be determined is converted to a binary code of $n$ bits, of which the lowest one bit is weighed one-eighth step. Based on the decimal number corresponding to the upper $m$ bits of the binary code, the frequency of the control signal is adjusted and is used in reading out the lower $(n - m)$ bits of the same binary code, whereby the period of actuation of the shutter is determined.

9 Claims, 11 Drawing Figures

FIG.1

| EXPOSURE TIME | | APERTURE VALUE | | FILM SENSITIVITY | | OBJECT LUMINANCE | | EXPOSURE VALUE | |
|---|---|---|---|---|---|---|---|---|---|
| SECOND (T) | Tv | APERTURE F VALUE (A) | Av | ASA (Sx) | Sv | FOOT-LAMBERTS (B) | Bv | $A^2/T$ | Ev |
| 1 | 0 | 1. | 0 | 3 | 0° | 1 | 0 | 1 | 0 |
| 1/2 | 1 | 1.4 | 1 | 6 | 1° | 2 | 1 | 2 | 1 |
| 1/4 | 2 | 2. | 2 | 12 | 2° | 4 | 2 | 4 | 2 |
| 1/8 | 3 | 2.8 | 3 | 25 | 3° | 8 | 3 | 8 | 3 |
| 1/16 | 4 | 4. | 4 | 50 | 4° | 16 | 4 | 16 | 4 |
| 1/32 | 5 | 5.6 | 5 | 100 | 5° | 32 | 5 | 32 | 5 |
| 1/64 | 6 | 8 | 6 | 200 | 6° | 64 | 6 | 64 | 6 |
| 1/128 | 7 | 11. | 7 | 400 | 7° | 128 | 7 | 128 | 7 |
| 1/256 | 8 | 16 | 8 | 800 | 8° | 256 | 8 | 256 | 8 |
| 1/512 | 9 | 22 | 9 | 1600 | 9° | 512 | 9 | 512 | 9 |
| 1/1024 | 10 | 32 | 10 | 3200 | 10° | 1024 | 10 | 1024 | 10 |

FIG.2

| EXPOSURE TIME (T) (SECOND) | APEX VALUE | BINARY CODE | | | | | | OCTONARY CODE | |
|---|---|---|---|---|---|---|---|---|---|
| | | 4 | 2 | 1 | 1/2 | 1/4 | 1/8 | | |
| 1 | 1 | 0 | 0 | 0 | 0 | 0 | 0 | 0 | 0 |
| 1/1.09 | 1/8 | 0 | 0 | 0 | 0 | 0 | 1 | | |
| 1/1.19 | 2/8 | 0 | 0 | 0 | 0 | 1 | 0 | | |
| 1/1.30 | 3/8 | 0 | 0 | 0 | 0 | 1 | 1 | | |
| 1/1.41 | 4/8 | 0 | 0 | 0 | 1 | 0 | 0 | | |
| 1/1.54 | 5/8 | 0 | 0 | 0 | 1 | 0 | 1 | | |
| 1/1.68 | 6/8 | 0 | 0 | 0 | 1 | 1 | 0 | | |
| 1/1.83 | 7/8 | 0 | 0 | 0 | 1 | 1 | 1 | | |
| 1/2 | 1 | 0 | 0 | 1 | 0 | 0 | 0 | 1 | 0 |
| ⋮ | ⋮ | | | | ⋮ | | | | |
| 1/4 | 2 | 0 | 1 | 0 | 0 | 0 | 0 | 2 | 0 |
| ⋮ | ⋮ | | | | ⋮ | | | | |
| 1/8 | 3 | 0 | 1 | 1 | 0 | 0 | 0 | 3 | 0 |
| ⋮ | ⋮ | | | | ⋮ | | | | |
| 1/15 | 4 | 1 | 0 | 0 | 0 | 0 | 0 | 4 | 0 |
| ⋮ | ⋮ | | | | ⋮ | | | | |
| 1/30 | 5 | 1 | 0 | 1 | 0 | 0 | 0 | 5 | 0 |
| 1/35 | 5 1/8 | 1 | 0 | 1 | 0 | 0 | 1 | | |
| 1/38 | 5 2/8 | 1 | 0 | 1 | 0 | 1 | 0 | | |
| 1/41.4 | 5 3/8 | 1 | 0 | 1 | 0 | 1 | 1 | | |
| 1/45 | 5 4/8 | 1 | 0 | 1 | 1 | 0 | 0 | | |
| 1/50 | 5 5/8 | 1 | 0 | 1 | 1 | 0 | 1 | | |
| 1/54 | 5 6/8 | 1 | 0 | 1 | 1 | 1 | 0 | | |
| 1/59 | 5 7/8 | 1 | 0 | 1 | 1 | 1 | 1 | | |
| 1/60 | 6 | 1 | 1 | 0 | 0 | 0 | 0 | 6 | 0 |
| ⋮ | ⋮ | | | | ⋮ | | | | |
| 1/125 | 7 | 1 | 1 | 1 | 0 | 0 | 0 | 7 | 0 |
| ⋮ | ⋮ | | | | ⋮ | | | | |
| 1/235 | 7 7/8 | 1 | 1 | 1 | 1 | 1 | 1 | 7 | 7 |
| ⋮ | ⋮ | | | | | | | | |
| 1/250 | 8 | | | | | | | | |

FIG.3

| $l$ | $2^{\frac{l}{8}}$ | $1+\frac{l}{8}$ | $1+\frac{l}{8}/2^{\frac{l}{8}}$ | $\log_2\left(1+\frac{l}{8}/2^{\frac{l}{8}}\right)$ |
|---|---|---|---|---|
| 1 | 1.0905077732 | 1.1250000000 | 1.0316295548 | 0.0492500014 |
| 2 | 1.1892071115 | 1.2500000000 | 1.0511205519 | 0.0719280094 |
| 3 | 1.2968395554 | 1.3750000000 | 1.0602699942 | 0.0844316188 |
| 4 | 1.4142135624 | 1.5000000000 | 1.0606660171 | 0.0849625000 |
| 5 | 1.5422108254 | 1.6250000000 | 1.0536821138 | 0.0754397180 |
| 6 | 1.6817928305 | 1.7500000000 | 1.0405562255 | 0.0573549222 |
| 7 | 1.8340080864 | 1.8750000000 | 1.0223509999 | 0.0318905950 |

EXPOSURE CONTROL DEVICE FOR A CAMERA

BACKGROUND OF THE INVENTION

1. Field of the Invention:

This invention relates to time interval control device, and more particularly to a time interval control device suitable for use in exposure control of a photographic camera and which operates with a very high accuracy such that the exposure time error is within a one-eight step.

2. Description of the Prior Art:

There is known an exposure control device of the type for controlling the shutter speed of a camera in accordance with the level of brightness of an object being photographed, wherein information representative of the object brightness level is converted by an analog-to-digital converter to a digital code which, after once being memorized, is digitally read out by a digital circuit to control the period of actuation of the shutter, as, for example, disclosed in U.S. Pat. No. 3,824,608.

Figure 1:
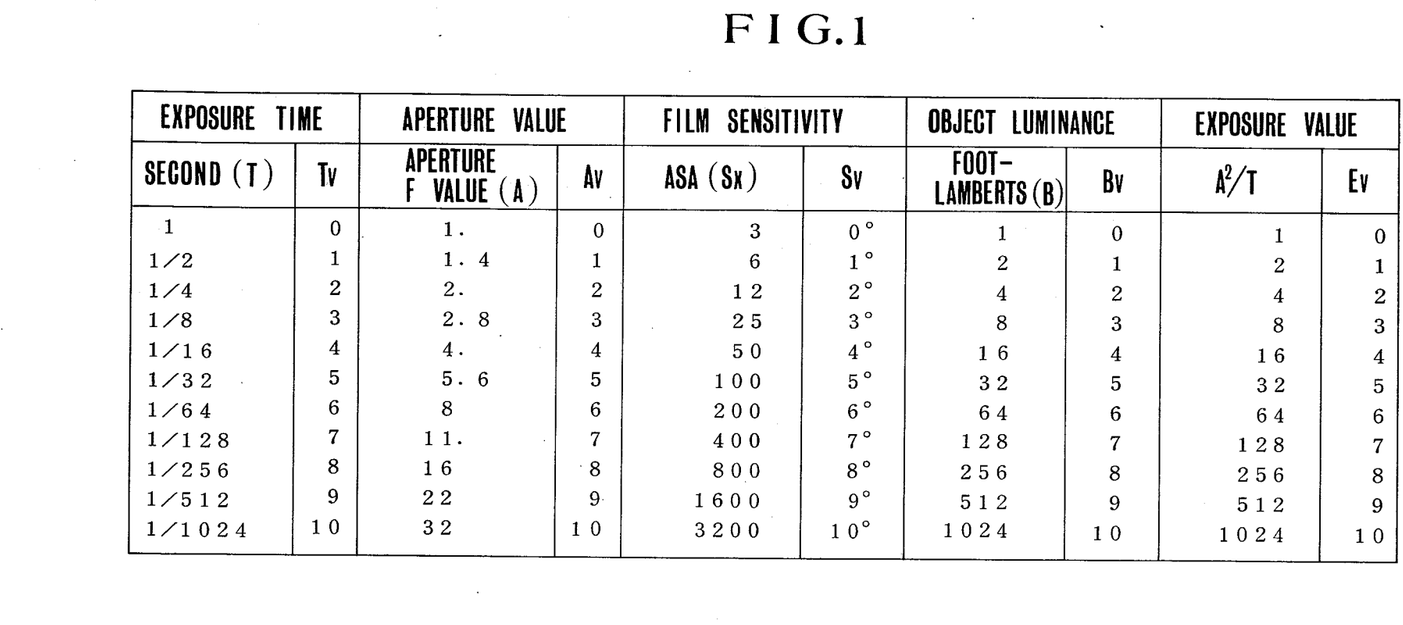
FIG. 1 is a table of numerical values for various exposure control parameters each expressed in the conventional unit and the APEX unit.

The conventional type exposure control device, however, controls exposure time in one-step progression, the exposure time error amounting to as large as ± ½ step, and accordingly has a drawback that the period of actuation of the shutter can not be controlled with high accuracy. The term "one step" herein used refers to a particular unit of exposure time expressed by APEX value. (APEX: Additive System of Photographic Exposure). The relationship between APEX values and corresponding time intervals in seconds is shown in FIG. 1. For example, APEX value 0 corresponds to one second, APEX value 1 to ½ second, and APEX value ⅛ to 0.917 second.

SUMMARY OF THE INVENTION

An object of the present invention is to provide a time interval control device capable of converting a digitally coded time information to an actual time interval with high accuracy.

Another object of the invention is to provide an exposure control device capable of controlling exposure time with extremely high accuracy.

Another object of the invention is to provide an exposure control device in which the error range of exposure time is within ⅛ step.

Another object of the invention is to provide an exposure control device employing a very simple circuit structure while nevertheless preserving extremely high exposure control accuracy.

Another object of the invention is to provide an exposure control device which operates in ⅛ step exposure time progression and which employs a circuit for reading out a value of exposure time memorized in ⅛ step unit.

Another object of the invention is to provide an exposure control device in which the circuit for reading out a value of exposure time memorized in ⅛ step unit is of very simple structure.

Another object of the invention is to provide an exposure control device having a frequency divider capable of dividing the frequency of a reference pulse train by 2 $k$, (wherein $k$ is an integer) and wherein the frequency divider serves as the circuit for reading out a value of exposure time memorized in ⅛ step unit.

Other objects of the present invention will become apparent from the following detailed description taken in conjunction with the accompanying drawings in which:

DESCRIPTION OF THE PREFERRED EMBODIMENTS

Figure 2:
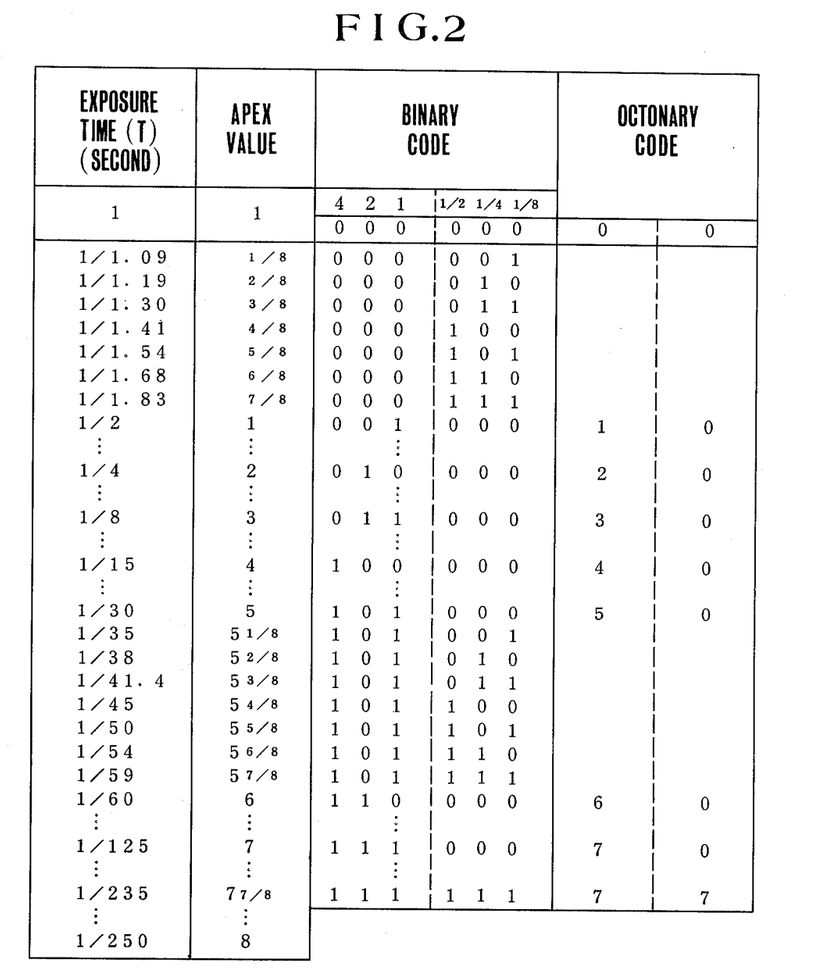
FIG. 2 is a table of numerical values for exposure time in second, APEX, and binary and octinary codes.
Figure 3:
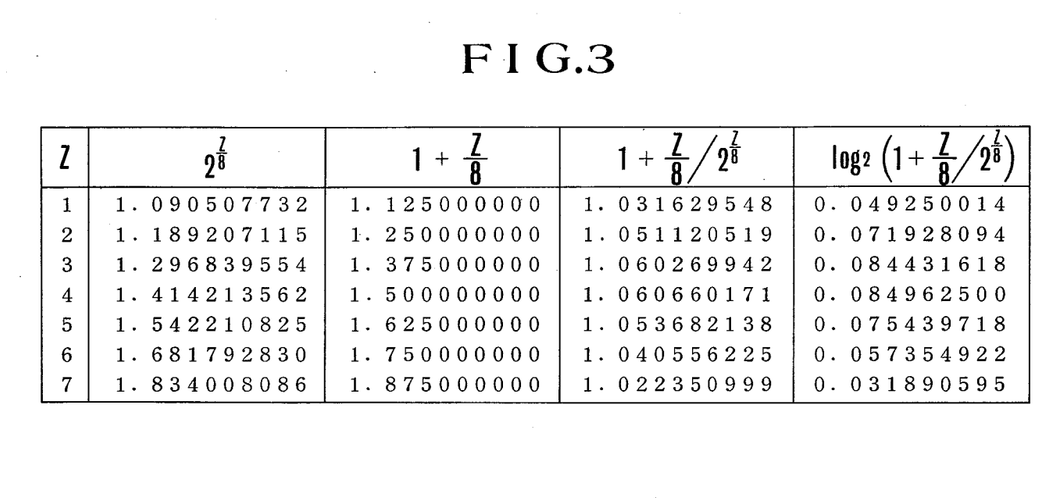
FIG. 3 is a table of numerical values showing the size of errors which result when $2^{z/8}$ is approximated by $[1 + z/8]$.

The mathematical principle on which the present invention is based will first be explained with reference to FIGS. 1, 2 and 3. In deriving an exposure value from preselected numerical values in the conventional units of various exposure control parameters such as shutter time in seconds, diaphragm aperture in F-value, film sensitivity in ASA, and object luminance in foot-lambert, it is required to represent these parameters in a common unit. For such a unit, the present invention employs a particular APEX unit. An example of representation of numerical values of the exposure control parameters in APEX unit in connection with those in the conventional units is shown in FIG. 1. In the case of exposure time, for example, while the numerical values T in seconds is in geometric sequence with a factor of ½, the numerical values Tv in APEX unit is in arithmetic sequence. In order to control the exposure time in progression of one-eight APEX unit steps, FIG. 2 provides a set of binary codes in six bits along with the corresponding set of octinary codes. It is to be noted in FIG. 2 that one-eight of the APEX unit corresponds to a factor of 1/1.09 for sequence of exposure time values in second, because of $8\sqrt{2} = 1.09$. Each of the binary codes has lower three bits, designated by reference characters ½, ¼ and ⅛, determining the decimal fraction of an APEX value, and has higher three bits, designated by reference characters 4, 2 and 1, determining an one of the integers from 0 to 7 inclusive of the same APEX value.

Now assuming that the reference time interval is 1/256 second which corresponds to an APEX value of 8, and that an exposure control system is responsive to the object luminance level to derive an exposure value, in this instance, an exposure time Tv in APEX unit, the exposure time differs from the reference time interval by a number of steps equal to 8-Tv. Expressing the APEX value 8-TV in the octinary system, as $m + (n/8)$, wherein $m$ and $n$ are integers from 0 to 7 inclusive, we have a formula of deriving an actual exposure time interval in second from this APEX value, as defined by $1/250 + 2^{[m + (n/8)]}$. The digital computation of a factor $2^{n/8}$ is of very complicated process. Therefore, according to the present invention, the factor $2^{n/8}$ is approximated by a factor $1 + (n/8)$. The numerical values of deviation from the true values under this approximation are given in FIG. 3. It is evident from FIG. 3 that the error estimated by the APEX unit-step is 0.085 step at maximum when $n = 4$, and consequently this error is negligible as compared with the one-eighth unit-step accuracy of exposure time control. In conclusion, the exposure time derived in APEX unit from the exposure control sytem can be reduced to an actual time interval T in second by computation based on the following formula:

$$T = (1/256) \times 2^m \times [1 + n/8] = (1/2048) \times 2^m \times (8 + n)$$

Figure 4:
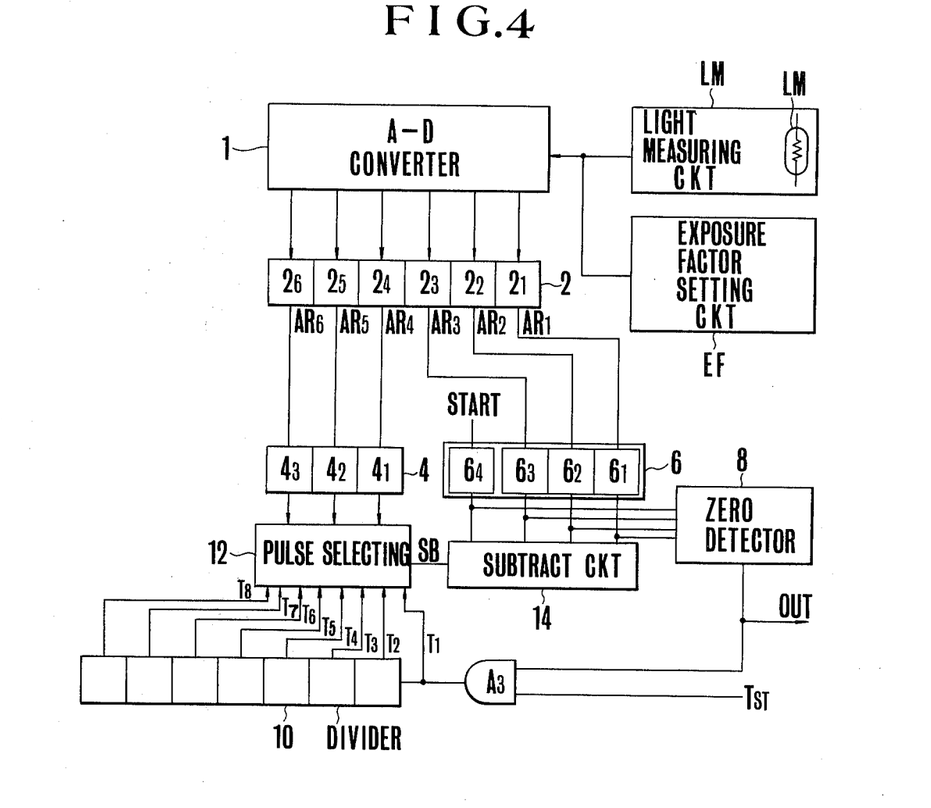
FIG. 4 is a block diagram of an exposure time control according to one embodiment of the present invention.

Referring now to FIG. 4, there is shown one embodiment of a time interval control system having a function of performing the above-defined computation according to the present invention as associated with an automatic exposure control system for a photographic camera. The automatic exposure control system may be of the conventional type, and is illustrated as having exposure control parameter setting circuit means EF capable, upon setting of preselected values of diaphragm aperture and film speed in the conventional units of producing respective electrical signals proportional to the selected values of these parameters in the APEX units, and light measuring circuit means LM responsive to the level of luminance of an object being photographed for producing an electrical signal proportional to the object luminance level in the APEX unit. In the illustrated embodiment, the time interval control system includes an analog-to-digital converter 1 receptive of both of the ouputs from the means EF and LM of the exposure control system for converting a combined output thereof to a corresponding six-bit binary coded information as a function of (8 - Tv), a store register 2 having six bits, designated by suffixed reference numerals $2_1$, $2_2$, $2_3$, $2_4$, $2_5$ and $2_6$, connected to respective output stages of the A-D converter 1 for storing the binary coded information in the form of $2^m \times (n/8)$, the number '$m$' being stored in the first three bits $2_6$, $2_5$, and $2_4$, and the number '$n$' being stored in the second three bits $2_3$, $2_2$ and $2_1$, a 1-2-4 binary coded integral control register 4 having three bits, designated by suffixed numerals $4_3$, $4_2$ and $4_1$, connected to respective outputs $AR_6$, $AR_5$ and $AR_4$ of the first three bits $2_6$, $2_5$ and $2_4$ respectively, and a 1-2-4-8 binary coded fractional control register 6 having four bits, three of which, designated by suffixed numerals $6_1$, $6_2$ and $6_3$, are connected to respective outputs $AR_1$, $AR_2$ and $AR_3$ of the register 2 respectively, and the other of which, designated by a suffixed numeral $6_4$ is connected to starting means not shown. The bit $6_4$ is weighted 8, and is set to a binary 1 condition when the starting means is actuated. As a result, at the time of actuation of the starting means, the binary coded fractional control register 6 provides information respresentative of the number $8 + n$).

Figure 6:
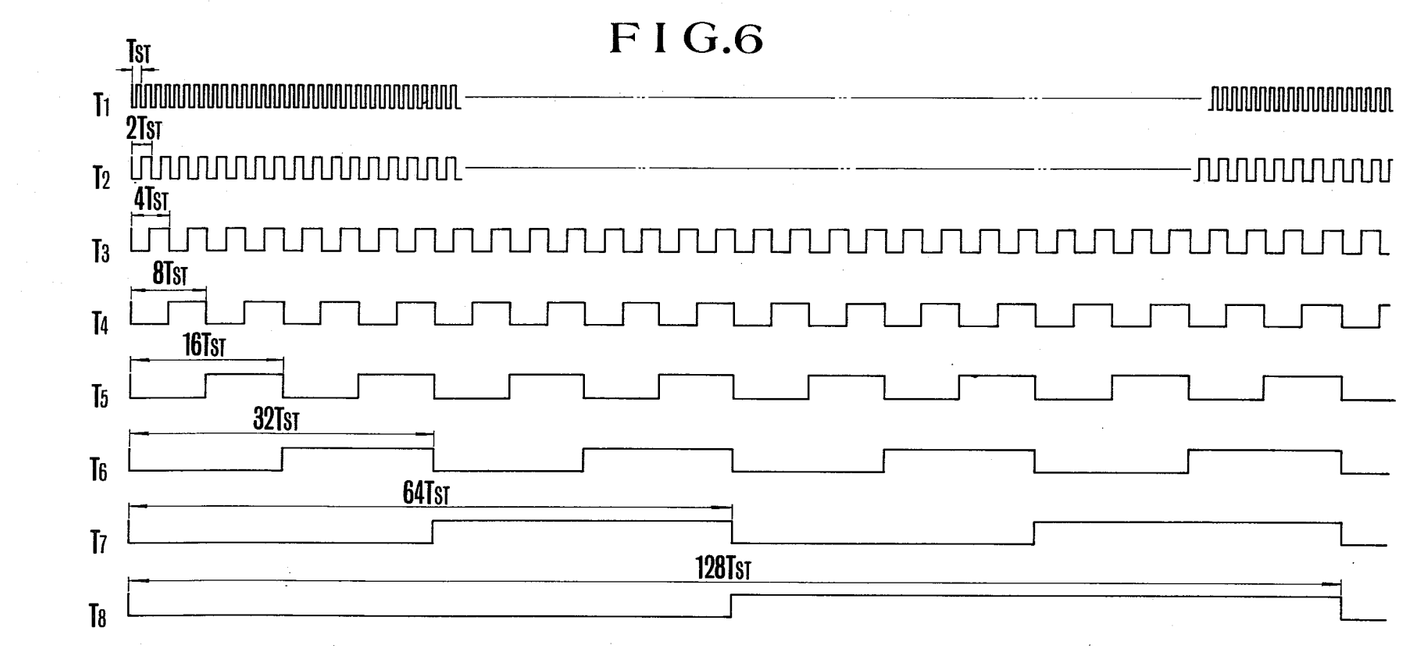
FIG. 6 is a pulse timing chart showing the manner in which the frequency divider of FIG. 5 may be used.

In accordance with the present invention, a binary frequency divider 10 is provided to multiply the pulse frequency, $fst$, in this instance, $fst = 2048$ in sec., of a clock pulse train T$st$ applied thereto through an AND gate $A_3$ by a set of decimal fractions, namely, $\frac{1}{2}$, $\frac{1}{4}$, $\frac{1}{8}$, 1/16, 1/32, 1/64 and 1/128, so as to produce eight pulse trains of different frequency as shown in the pulse timing chart of FIG. 6, wherein a first pulse train with $fst$ = 2048 in sec. appears at a first output terminal $T_1$ of the frequency divider 10, a second pulse train with $\frac{1}{2}fst$ at the second output terminal thereof, a third pulse train with $\frac{1}{4}fst$ at the third output terminal $T_3$, a fourth train with $\frac{1}{8} \cdot fst$ at the fourth output terminal $T_4$, a fifth pulse train with $1/16 \cdot fst$ at the fifth output terminal $T_5$, a sixth pulse train with $1/32 \cdot fst$ at the sixth output terminal $T_6$, a seventh pulse train with $1/64 \cdot fst$ at the seventh output terminal $T_7$, and an eighth pulse train with $1/128 \cdot fst$ at the eighth output terminal $T_8$. All of these eight pulse trains $T_1$ through $T_8$ are applied to a pulse frequency selector 12 which is controlled by the output of the 1-2-4 binary coded integral control register 4, so as to select which of the pulse trains $T_1$ through $T_8$ is to be passed to a subtractor 14, thereby determining the period of time during which a count-down operation of the subtractor 14 occurs in synchronism with one pulse in the passed or selected pulse train to subtract one from the number $(8 + n)$ previously registered in the 1-2-4-8 binary coded fractional control register 6. At the time the number $(8 + n)$ has been counted down completely, or all of the four bits in the register 6 are reset to their binary 0 conditions, a zero detector 8 produces an output signal of low level (hereinafter referred to as binary 0 level). Ao long as any one of the four bits of the register 6 remains in the binary 1 condition, the zero detector 8 produces an output signal of high level (hereinafter referred to as binary 1 level). The output of the zero detector 8 is applied to the gating control input of the AND gate $A_3$, and is also connected to a shutter control circuit not shown of the exposure control system.

Figure 5:
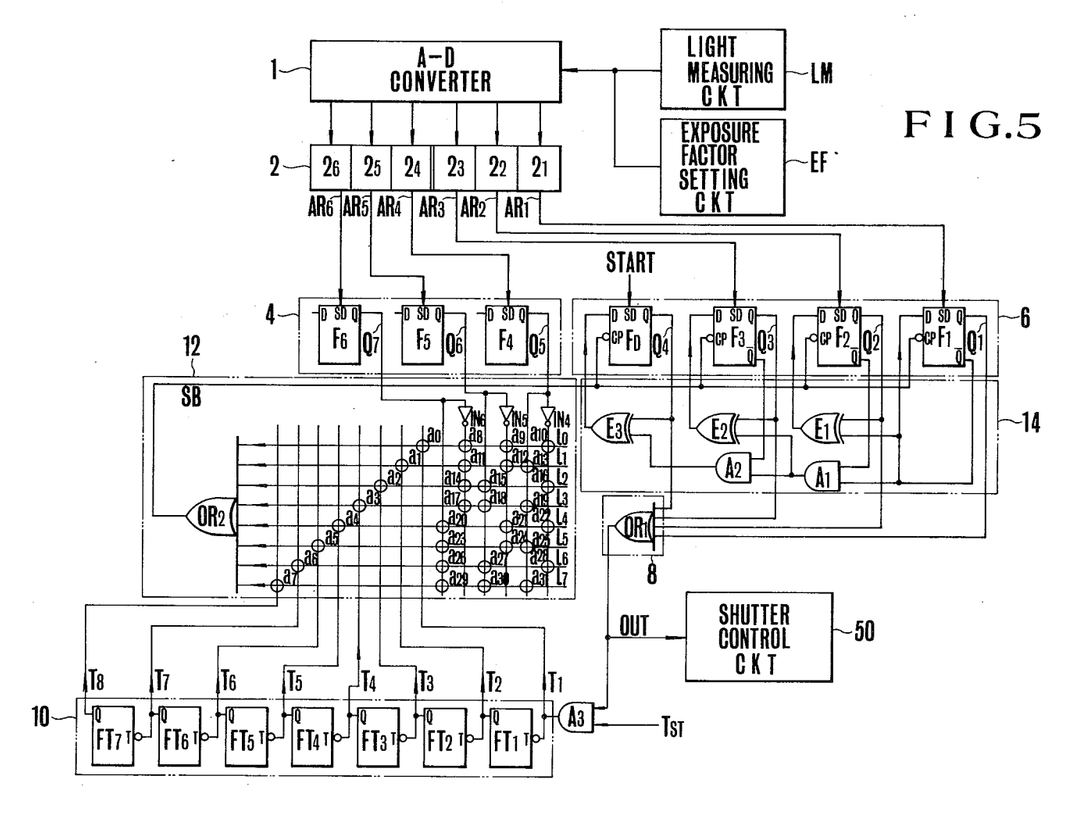
FIG. 5 is a schematic electrical circuit diagram of the system of FIG. 4.

Referring to FIG. 5, there is shown an example of an electrical circuitry usable in the time interval control system of FIG. 4. In FIG. 5, the binary coded integral control register 4 comprises three flip-flops $F_4$, $F_5$ and $F_6$ connected at their set-direct terminals SD to respective output terminals $AR_4$, $AR_5$ and $AR_6$ of the store register 2 respectively, upon application of signals to the set-direct terminals SD from the output terminals $AR_2$, $AR_5$ and $AR_6$ to be set either to the binary 1 condition, or the binary 0 condition. The binary coded fractional control register 6 comprises four flip-flops $F_1$, $F_2$, $F_3$ and FD connected at their set-direct terminals SD to respective output terminals $AR_1$, $AR_2$ and $AR_3$ of the store register 2 and the start signal input terminal START respectively. At the time when the flip-flop FD is set to the binary 1 condition in response to the start signal applied to the set-direct terminal SD thereof, the flip-flops $F_1$, $F_2$ and $F_3$ are supplied with the respective outputs from the lower three bits $2_1$, $2_2$ and $2_3$ of the store register 2. The zero detector 8 comprises an OR gate $OR_1$ connected to all of the first output terminal Q's of the four flip-flops $F_1$, $F_2$, $F_3$ and FD and having a single output connected to the gating control input of the AND gate $A_3$. The frequency divider 10 comprises seven T-type flip-flops $FT_1$ through $FT_7$, the first flip-flop $FT_1$ having an input terminal T connected to the output of the AND gate $A_3$, the second flip-flop $FT_2$ having an input terminal T connected to an output terminal of the first flip-flop $FT_1$, the third flip-flop FT$_3$ having an input terminal T connected to an output terminal Q of the second flip-flop FT$_2$, and so on.

The pulse frequency selector 12 comprises an arrangement of 32 gating elements $a_0$ through $a_{31}$ on seven conductors $1_0$ through $1_7$ and an OR gate OR$_2$ connected to all of the conductors $1_0$ through $1_7$. Gate element $a_0$ is gated on the pass the first pulse train T$_1$ of FIG. 6 to the OR gate OR$_2$ when all of the three flip-flops F$_4$, F$_5$ and F$_6$ are in their binary 0 conditions, under which an output is caused to appear in conductor $1_0$ by gate elements $a_8$, $a_9$ and $a_{10}$ connected through respective inverters IN$_6$, IN$_5$ and IN$_4$ to the outputs Q$_7$, Q$_6$ and Q$_5$ of flip-flops F$_6$, F$_5$ and F$_4$ respectively. Gate element $a_1$ is gated on to pass the second pulse train T$_2$ when flip-flops F$_6$, F$_5$ and F$_4$ are in the binary 0, 0 and 1 conditions respectively, under which an output is caused to appear in conductor $1_1$ by gate elements $a_{11}$, $a_{12}$ and $a_{13}$ connected to inverters IN$_6$ and IN$_5$ and output Q$_5$ respectively. Gate element a$_2$ is gated on to pass the third pulse train T$_3$ when flip-flops F$_6$, F$_5$ and F$_4$ are in the binary 0, 1 and 0 conditions respectively, under which an output is caused to appear in conductor $1_2$ by gate elements $a_{14}$, $a_{15}$ and $a_{16}$ connected to inverter IN$_6$, output Q$_6$ and inverter IN$_4$ respectively. Gate element $a_3$ is gated on to pass the fourth pulse train T$_4$ when flip-flops F$_6$, F$_5$ and F$_4$ are in the binary 0, 1 and 1 conditions respectively, under which an output is caused to appear in conductor $1_3$ by gate elements $a_{17}$, $a_{18}$ and $a_{19}$ connected to inverter IN$_6$ and outputs Q$_6$ and Q$_5$ respectively. Gate element $a_4$ is gated on to pass the fifth pulse train T$_5$ when flip-flops F$_6$, F$_5$ and F$_4$ are in the binary 1, 0 and 0 conditions respectively, under which an output is caused to appear in conductor $1_4$ by gate elements $a_{20}$, $a_{21}$ and $a_{22}$ connected to output Q$_7$ and inverters IN$_5$ and IN$_4$ respectively. Gate element $a_5$ is gated on to pass the sixth pulse train T$_6$ when flip-flops F$_6$, F$_5$ and F$_4$ are in the binary 1, 0 and 1 conditions respectively, under which an output is caused to appear in conductor $1_5$ by gate elements $a_{23}$, $a_{24}$ and $a_{25}$ connected to output Q$_7$, inverter IN$_5$ and output Q$_5$ respectively. Gate element $a_6$ is gated on to pass the seventh pulse train T$_7$ when flip-flops F$_6$, F$_5$ and F$_4$ are in the binary 1, 1 and 0 conditions respectively, under which an output is caused to appear in conductor $1_6$ by gate elements $a_{26}$, $a_{27}$ and $a_{28}$ connected to outputs Q$_7$ and Q$_6$ and inverter IN$_4$ respectively. Gate element $a_7$ is gated on to pass the eighth pulse train T$_8$ when all of flip-flops F$_4$, F$_5$ and F$_6$ are in their binary 1 conditions, under which an output is caused to appear in conductor $1_7$ by gate elements $a_{29}$, $a_{30}$ and $a_{31}$ connected to outputs Q$_7$, Q$_6$ and Q$_5$ respectively. It is evident that the pulse frequency selector 12 provides a pulse train of a pulse period corresponding to $2^m \times$ Tst.

The subtractor 14 comprises three exclusive OR gats E$_1$, E$_2$ and E$_3$, and two AND gates A$_1$ and A$_2$ connected to each other and to the flip-flops F$_1$, F$_2$, F$_3$ and FD of the binary coded fractional control register 6 in such a manner as to be described below. Each of the four flip-flops F$_1$, F$_2$, F$_3$ and FD has a control pulse or first input terminal CP connected to the output terminal SB of the pulse frequency selector 12 so that when a pulse of the selected pulse train is applied to the input terminal CP, the flip-flop is inverted from one binary condition to the other, and first and second outputs terminals Q and $\overline{Q}$ at which an output appears when the flip-flop is in the binary 1 or 0 condition respectively. Flip-flop F$_1$ has the first output terminal Q connected to the OR gate OR$_1$ of the zero detector 8, and has the second output terminal $\overline{Q}$ connected to another input terminal D thereof so that, upon application of a pulse to the first input terminal CP, flip-flop F$_1$ is inverted. Flip-flop F$_2$ has the first output terminal Q connected to the OR gate OR$_1$, and has a seond input terminal D connected to the output terminal of the first exclusive OR gate E$_1$ having two inputs one of which is connected to the first output terminal Q of flip-flop F$_2$, and the other of which is connected to the second output terminal $\overline{Q}$ of flip-flop F$_1$, so that flip-flop F$_2$ is inverted by application of a pulse to the first input CP thereof, only when flip-flop F$_1$ is in the binary 0 condition. Flip-flop F$_3$ has the first output terminal Q connected to the OR gate OR$_1$, and has the second input terminal D connected to the output terminal of the second exclusive OR gate E$_2$ having two input terminals, one of whcih is connected to the first output termina Q of flip-flop F$_3$, and the other of which is connected through the first AND gate A$_1$ to the second output terminal $\overline{Q}$ of flip-flops F$_1$ and F$_2$, so that flip-flop F$_3$ is inverted by application of a pulse to the first input terminal CP thereof only when flip-flops F$_1$ and F$_2$ are simultaneously in the binary 0 conditions. Flip-flop FD has the first output terminal Q connected to the OR gate OR$_1$, and has the second input terminal D connected to the output of the third exclusive OR gate E$_3$ having two inputs, one of which is connected to the first output terminal Q of flip-flop FD, and the other of which is connected through AND gates A$_1$ and A$_2$ to the second output terminals $\overline{Q}$ of flip-flops F$_1$, F$_2$ and F$_3$, so that flip-flop FD is inverted by application of a pulse to the first input terminal CP thereof only when flip-flops F$_1$, F$_2$ and F$_3$ are simultaneously in the binary 0 conditions.

The operation of the electrical circuit of the time interval control system of FIGS. 4 and 5 will next be described in connection with FIGS. 6 and 7.

Now assuming that an APEX value of exposure time derived from the exposure control factor setting circuit means EF and the light measuring circuit means LM is 5.3 in the octanary system which corresponds to 5.375 in the denary system to 101011 in the binary system, and to 1/39.0 second as is understandable from FIG. 2, the A-D converter 1 converts this exposure time in the APEX unit to a binary code based on the formula (8 -Tv) = 8.0 - 5.3 = 2.5. It is to be noted with respect to the formula $2^m \times (8 + n)$ that $m = 2$ and $n = 5$. The binary code corresponding to the octanary number 2.5 is 010101 which is previously registered in the store register 2.

Figure 7:
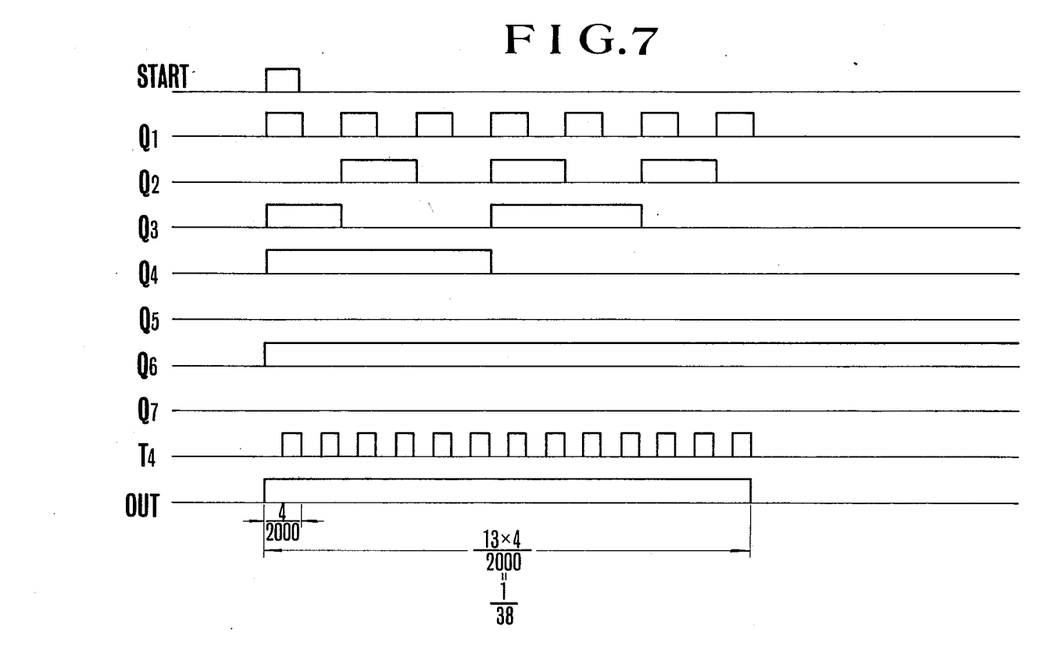
FIG. 7 is a pulse timing chart showing the manner in which the circuit of FIG. 5 may be used.

When a shutter release button not shown of the camera is depressed, a starting pulse of wave form shown in FIG. 7 is applied to the set-direct terminal SD of flip-flop FD in synchronism at the leading edge of the starting pulse with the tailing edge of a pulse of clock pulse train Tst, thereby flip-flop FD is set to the binary 1 condition. In synchronism with the setting of flip-flop FD, there is caused by not shown means known in the art the flip-flops F$_6$, F$_5$ and F$_4$ in the binary integral control register 4 and the flip-flops F$_3$, F$_2$ and F$_1$ in the binary fractional control register 6 all to be set to their respective binary conditions in accordance wt with the outputs of the store register 2, namely, to the binary 0, 1, 0, 1, 0 and 1 conditions respectively. Responsive to the binary 0 output appearing in the output lead Q$_7$ of flip-flop F$_6$, inverter IN$_6$ actuates gate elements $a_8$, $a_{11}$, $a_{14}$ and $a_{17}$. As the binary 1 output appears in the output terminal Q$_6$ of flip-flop F$_5$, gate elements $a_{15}$, $a_{18}$, $a_{27}$ and $a_{30}$ are actuated directly by the binary 1 output. Responsive to the binary 0 output appearing in the output terminal $Q_5$, the inverter $IN_4$ actuates gate elements $a_{10}$, $a_{16}$, $a_{22}$ and $a_{28}$. As a result, an output appears in the common conductor $1_2$ of gate elements $a_{14}$, $a_{15}$ and $a_{16}$, so that gate element $a_2$ is gated on to pass the third pulse train $T_3$ with a frequency of 2048 × $(\frac{1}{2})^2$ as the parameter $m$ is 2.

As shown in FIG. 7, flip-flops $F_1$, $F_2$, $F_3$ and FD in the binary coded fractional control register 6 produce outputs appearing at output terminals $Q_1$, $\overline{Q}_2$, $Q_3$ and $Q_4$ respectively in synchronism with occurrence of the starting pulse, causing the zero detector 8 to produce an output which in turn causes the camera shutter to be opened through a shutter control circuit 50, and which also causes the third AND gate $A_3$ to be gated on to pass the clock pulse train $Tst$ to the frequency divider 10. As the gate element $a_2$ is gated on by the binary coded integral control register 4 to select the third pulse train $T_3$, the first input pulse of pulse train $T_3$ is applied to the control pulse input terminal of each of flip-flops $F_1$, $F_2$, $F_3$ and FD, thereupon only the first flip-flop $F_1$ is inverted into the binary 0 condition causing the binary 0 output to appear at the output terminal $\overline{Q}_1$ of flip-flop $F_1$. Upon advent of the second input pulse $T_3$ on register 6, flip-flops $F_1$ and $F_2$ are inverted from their binary 0 to 1 conditions, and flip-flop $F_3$ is inverted from its binary 1 to 0 condition, as flip-flops $F_1$ and $F_2$ are in the binary 0 conditions before the advent of the second input pulse $T_3$, while flip-flop FD remains uninverted. Upon advent of the third input pulse $T_3$ on the register 6, only the first flip-flop $F_1$ is inverted from the binary 1 to 0 condition, and the other flip-flops $F_2$, $F_3$ and FD remain uninverted Such a count-down operation repeats itself each time an input pulse is applied to the register 6 until the thirteenth input pulse of pulse train $T_3$ is applied to the register 6, as can be seen from FIG. 7. Upon setting of the first flip-flop $F_1$ to the binary 0 condition by application of the thirteenth input pulse thereto, the zero detector 8 produces no output, thereby the camera shutter is closed, and the clock pulse train $Tst$ is blocked by AND gate $A_3$ from entering the divider 10. The period of actuation of the camera shutter is consequently determined as $2^m \times (8 + n) \times Tst$, wherein $Tst$ is the time interval in second between the successive two clock pulses, namely, $4 \times (1/2048) \times (8 + 5 = 1/39.4$ second. The error estimated as a difference between this value 1/39.4 and the true value 1/39.0 is about 1 per percent. Therefore, it is to be understood that the accuracy of exposure time control is as high as an order of less than one-eight APEX unit step.

Figure 8:
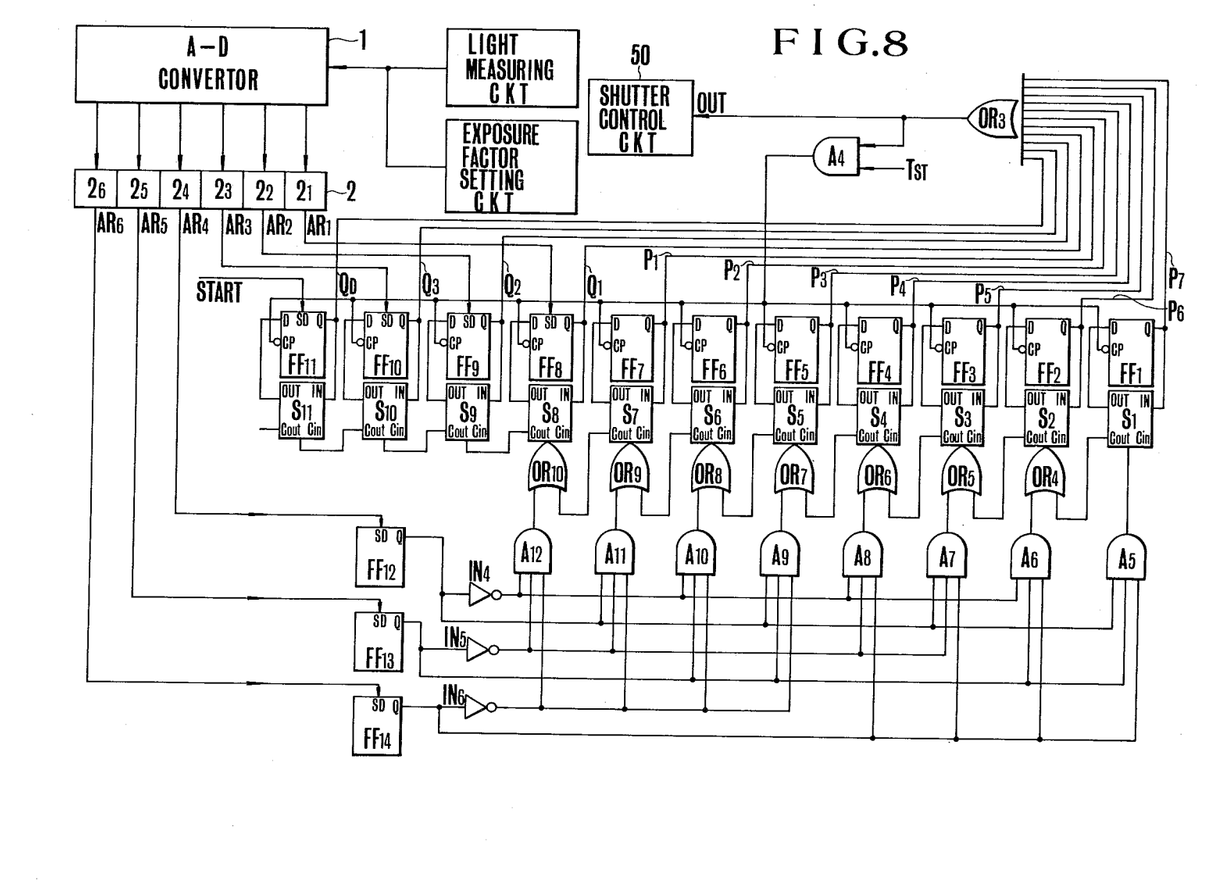
FIG. 8 is a schematic electrical circuit diagram of a time period control system according to another embodiment of the present invention.

Referring to FIG. 8, there is shown another embodiment of a time interval control system according to the present invention as applied to an exposure control circuit for controlling the period of actuation of the electronic shutter of a camera. Whilst the first embodiment of the invention is adapted to count the number of pulses defined as $(8 + n)$ with a modification of the clock pulse frequency, 2048 per second, as dividing by $2^m$, the second embodiment is to count the number of pulses defined as $2^m (8 + n)$ at the same clock pulse frequency regardless of variation of the parameter $m$, provided that the value of reference time interval, e.g., 1/256 second remains unchanged.

In accordance with the second embodiment of the invention, there are provided fourteen flip-flops F.F. 1 through F.F.14, with F.F.12, F.F.13 and F.F.14 constituting a binary coded integral control register and connected through respective signal transmission lines $AR_4$, $AR_5$ and $AR_6$ to the first three bits $2_4$, $2_5$ and $2_6$ of a store register 2 respectively, with F.F.8, F.F.9 and F.F.10 constituting a binary coded fractional control register and connected through respective signal transmission lines $AR_1$, $AR_2$ and $AR_3$ at the set-direct terminals thereof with the second three bits $2_1$, $2_2$ and $2_3$ of the store register 2 respectively, and with F.F.11 connected at the set-direct terminal thereof to a START signal generator not shown. With this arrangement of the flip-flops F.F.8 through F.F.14, it is possible to register a binary coded information representative of the numbers $m$ and $(8 + n)$ in a manner similar to that shown in the first embodiment of the invention.

Figure 9:
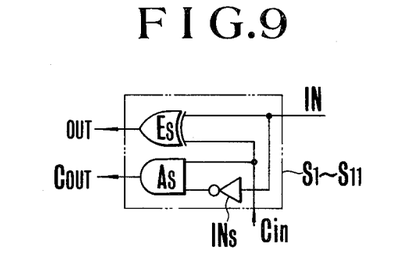
FIG. 9 is an example of a subtraction circuit usable in any one of the blocks $S_1$ through $S_{11}$ of FIG. 8.

Eleven subtractor elements $S_1$ through $S_{10}$ are provided for connection with flip-flops F.F.1 through F.F.11 in such a manner as to perform a count-down operational identical to that of the circuit of FIG. 5 each time a clock pulse is applied to the clock pulse input terminals CP of F.F.'s 1 through 11. As shown in FIG. 9, each of the substractor elements $S_1$ through $S_{11}$, for example, element $S_6$ comprises an exclusive OR gate Es having two input terminals IN and C$in$ the former input terminal IN of which is connected to an output Q of F.F.6 and the latter terminal C$in$ of which is connected to the output terminal of an OR gate 8, and having an output terminal OUT connected to an input terminal D of F.F. 6, and an AND gate As having two terminals, one of which is connected through an inverter IN$s$ to the output terminal Q of F.F. 6, and the other of which is connected to the terminal C$in$, and having an output terminal C$out$ connected through an OR gate 9 to the C$in$ terminal of subtractor element 7.

Eight AND gates $A_5$ through $A_{12}$ are provided in combination with three inverters $IN_4$, $IN_5$ and $IN_6$ for cooperation with the three flip-flops F.F.12, F.F.13 and F.F.14 in such a manner that an output of high level or binary level appears at the output terminal of one of the AND gates $A_{12}$ through $A_5$ when $m = 0, 1, 2, 3, 4, 5, 6$ or 7 respectively. For this purpose, AND gate $A_5$ has three input terminals connected to respective output terminals Q of F.F.'s 12, 13 and 14. AND gate $A_6$ has three input terminals, one of which is connected through inverter $IN_4$ to the output terminal Q of F.F.12, and the other two of which are connected to the output terminals Q of F.F's 13 and 14. AND gate $A_7$ has three input terminals one of which is connected through inverter $IN_5$ to the output terminal Q of F.F. 13 and the other two of which are connected to the output terminals Q of F.F.'s 12 and 14. AND gate 8 has three input terminals, two of which are connected through inverters $IN_4$ and $IN_5$ to the output terminals Q of F.F.'s 12 and 13, and the other of which is connected to the output terminal Q of F.F. 14. AND gate $A_9$ has three input terminals, one of which is connected through inverter $IN_6$ to the output terminal Q of F.F. 14, and the other two of which are connected to the output terminals Q of F.F.'s 12 and 13. AND gate 10 has three input terminals, two of which are connected through inverters $IN_4$ and $IN_6$ to the output terminals Q of F.F.'s 12 and 14, and the other of which is connected to the output terminal of F.F. 13. AND gate 11 has three input terminals, two of which are connected through inverters $IN_5$ and $IN_6$ to the output terminals Q of F.F.'s 13 and 14, and the other of which is connected to the output terminal Q of F.F. 12. AND gate 12 has three input terminals, all of which are connected through inverters $IN_4$, $IN_5$ and $IN_6$ to the output terminals of F.F. 12, 13 and 14 respectively.

The output terminal of AND gate $A_5$ is connected to the input terminal $C_{in}$ of subtractor element $S_1$. The output terminals of AND gates $A_6$ through $A_{12}$ are connected through OR gates $OR_4$ through $OR_{10}$ to subtractor element $S_2$ through $S_8$ respectively. The output terminal $C_{out}$ of subtractor element $S_1$ is connected through OR gate $OR_4$ to the input terminal $C_{in}$ of subtractor element $S_2$, and the output terminal $C_{out}$ of subtractor element $S_2$ is connected through OR gate $OR_5$ to the input terminal $C_{in}$ of subtractor $S_3$, and so on. The output terminal $C_{out}$ of subtractor element $S_8$ is connected to the input terminal $C_{in}$ of subtractor element $S_9$, the output terminal $C_{out}$ of subtractor element $S_9$ is connected to the input terminal $C_{in}$ of subtractor element $S_{10}$, and the output terminal $C_{out}$ of subtractor element $S_{10}$ is connected to the input terminal $C_{in}$ of subtractor element $S_{11}$. All of the output terminals of F.F.'s 1 through 11 are connected to an OR gate 3 having an output terminal connected to a shutter control circuit 50 and to one of two input terminals of an AND gate $A_4$, the other of which is supplied with a clock pulse train $T_{st}$. The output terminal of AND gate $A_4$ is connected to all of the clock pulse input terminals CP of F.F.'s 1 through 11.

In operation, an APEX value of exposure time Tv to be converted to an actual time interval is given as 5.3 in the octanary scale to the A-D converter 1 in which it is converted to a binary code 010101 based on the formula: Number of steps in APEX unit deviated from the reference time interval, it this instance, 1/256 second = 8.0 − Tv = 2.5 in the octanary scale. The binary code 010101 is registered in the respective bits of register 2. In synchronism with occurence of a pulse at the set-direct terminal of flip-flop F.F. 11, the binary coded information is applied from register 2 to F.F.'s 14, 13, 12, 10, 9 and 8 through transmission lines $AR_6$ through $AR_1$ respectively, thereby F.F.'s 14, 13 and 12 are set to the binary 0, 1 0 conditions respectively, and F.F.'s 11, 10, 9 and 8 are set to the binary 1, 1, 0, 1 conditions respectively in a manner similar to that shown in connection with FIGS. 5, 6 and 7. F.F.'s 12, 13 and 14 are decoded by AND gates $A_5$ through $A_{12}$, causing only one AND gate, namely, $A_{10}$ to produce an output of high level, while permitting the other AND gates to produce outputs of low level. The output of AND gate $A_{10}$ is applied through OR gate 8 to the input terminal $C_{in}$ of subtractor element $S_6$, whereby F.F.'s 6 through 11 are rendered effective for counting-down operation, and F.F.'s 1 through 5 remain ineffective during this counting-down operation. In other words, the counting-down operation proceeds to count the number of clock pulses corresponding to the binary code 110100 initially registered in F.F.'s 11 through 6 respectively, and which is equal to the decimal number $2^m \times (8 + n) = 4(8 + 5) = 52$.

After AND gate 4 is gated on in synchronism with occurence of outputs of high level appearing at the output terminals $Q_1$, $Q_3$ and QD of F.F.'s 8, 10 and 11, the first input pulse of the clock pulse train passing through the thus gated AND gate 4 applied to the input terminal CP of each of F.F.'s 6 through 11, thereby F.F.'s 6, 7 and 8 are inverted and F.F.'s 9, 10 and 11 remain uninverted. This is because subtractor element $S_6$ passes the output of AND gate 10 to the input terminal D of F.F. 6 causing F.F. 6 to be inverted each time an input pulse is applied to the input terminal CP thereof, and because the output of the binary 0 level applied from F.F. 6 to the input terminal IN of subtractor element $S_6$ is inverted to a signal of the binary 1 level by the inverter INs thereof and then applied to the AND gate As thereof, causing the AND gate As to produce an output which is then applied to the input terminal $C_{in}$ of the next subtractor element 7. Further, in a similar manner to the above, an output is applied from the output terminal $C_{out}$ of subtractor element 7 to the input terminal $C_{in}$ of the next subtractor element 8, but no output is applied from the output terminal $C_{out}$ of subtractor element 8 to the input terminal $C_{in}$ of the next subtractor element $S_9$ because F.F. 8 has the binary 1 condition preventing the AND gate As of subtractor element 8 from being gated by the output from subtractor element 7. Such a binary one-unit counting-down procedure repeats itself until the fifty-second clock pulse occurs. At the moment the tailing edge of the 50-second clock pulse passes the AND gate $A_4$, the duration of actuation of the OR gate $OR_3$ is terminated to close the AND gate $A_4$ and the camera shutter through the shutter control circuit 50. Thus, the period of actuation of the camera shutter is determined as $52 \times 1 / 2048 = 1/39.4$ second, provided that the pulse frequency of the clock pulse train is 2048 per second.

The present invention has been described in connection with two specific examples wherein an information in the form of an APEX value of exposure time as an exposure value derived from an automatic exposure control system is converted by the analog-to-digital converter 1 to a corresponding binary coded information in an automatic manner. Such examples can be changed in many ways, as for example, adapted to the purpose of manually setting the register 2 to a particular binary condition dependent upon a preselected exposure time. An example of a manually operating time interval control system is fragmentally shown in FIGS. 10 and 11.

Figure 10:
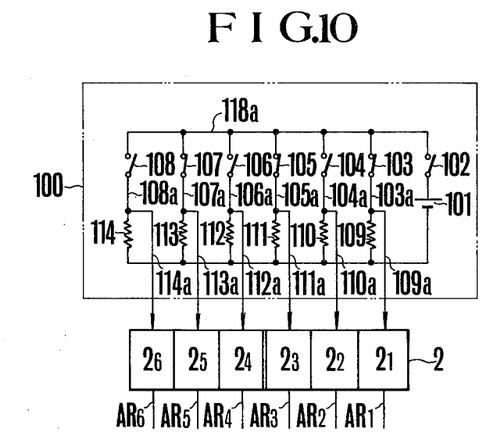
FIG. 10 is a fragmentary schematic electrical circuit diagram of still another embodiment of the present invention.
Figure 11:
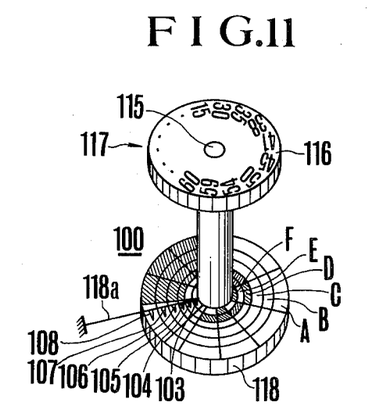
FIG. 11 is a perspective view of a shutter speed setting means adapted for association with the encoding section of the circuit of FIG. 10.

FIG. 10 shows an encoder 100 adapted for operative association with a shutter speed selector shown in FIG. 11. The encoder 100 comprises a battery 101, a power switch 102, six switch element 103 through 108 connected between a common positive bus 118a connected through the power switch 102 to the positive terminal of the battery 101 and respective bits of the register 2 through first lead wires 103 through 108a and second lead wires 109 through 114a respectively, and six resistors 109 through 114 connected between a common negative bus and respective points on connections between the first lead wires 103a through 108a and the second lead wires 109a through 114a respectively. An example of construction and arrangement of the six switch elements 103 through 108 is shown in FIG. 11, wherein 116 is a shutter speed selector dial having cut thereon graduations representing a series of shutter speeds in second and cooperative with a stationary index 117 provided on a camera housing not shown. The shutter dial 116 is fixedly mounted on a shaft 115 at one end thereof, and the opposite end of which fixedly carries a code disk 118 made of a conducting material and having a peripheral side slidably engaging with one end of the lead wire 118a connected to the positive bus of the circuit of FIG. 10. The disk 118 is provided with six concentrical resistor tracks A through F cooperative with switch contacts 108 through 103 respectively as arranged upon rotation of the dial 116 to be slidable on the respective tracks A through F, each track being divided into 64 parts, though illustrated with far smaller parts for purpose of clarity, some parts of which are electrically conductive and the other parts of which are electrically insulated. The arrangement of these parts in all the tracks A through F is such that when a graduation representing a desired shutter speed, for example, 1/39 second is placed in alignment with the stationary index 117, switch elements 103, 105 and 107 are closed, and switch elements 104, 106 and 108 and left open to set the bits 6, 5, 4, 3, 2 and 1 of register 2 to the binary 0, 1, 0, 1, 0 and 1 conditions respectively. The subsequent operation will proceeds in a manner similar to that shown in connection with FIGS. 6 and 8.

It will be seen from the foregoing description that according to the present invention, the exposure time error can be limited to less than the one-eighth step. Further, the present invention contemplates the use of a frequency divider of simple structure such as comprising a plurality of cascade-connected flip-flops arranged in the time interval control circuit to divide the pulse frequency of a clock pulse train by a factor $1/2^m$, wherein $m$ is an integer determined as equal to the decimal number of a binary code registered in the higher bits of the register 2, or otherwise would necessitate rate multiplier thereby the complexity of the circuit would be increased with increase in the production cost thereof.

The present invention has been described in detail with particular reference to preferred embodiments thereof, but it will be understood that variations and modificatios can be effected within the spirit and scope of the invention as described hereinabove and as defined in the appended claims.

What is claimed is:

1. An electric shutter control device comprising:
   a. photosensitive means for converting the intensity of light into a first electrical signal corresponding to the intensity;
   b. an analog-to-digital converter for converting said first electrical signal to a digital signal of $n$ bits, wherein $n$ is an integer;
   c. register means including an integral part register which stores an integral part of said digital signal of $n$ bits and a fractional part register which stores a fractional part of the digital signal of $n$ bits;
   d. a frequency divider for forming a plurality of first control signals having frequencies differentiated from each other by a multiplier $1/2k$, wherein $k$ is an integer;
   e. a selecting circuit responsive to the content of said integral part register for selecting one of said control signals from said frequency divider;
   f. a detecting circuit to said selecting circuit and said register means for detecting the content of the fractional part register and producing a second control signal when a predetermined relationship occurs between the number of pulses of the first control signal and the content of the fractional part register; and
   g. shutter control means responsive to the second control signal from said detecting circuit from controlling the period of actuation of the shutter.

2. An electric shutter control device according to claim 1, wherein said register means includes a plurality of flip-flop circuits.

3. An electric shutter control device according to claim 1, wherein said detecting circuit comprises:
   a. a subtracting circuit responsive to the first control signal for subtracting the content memorized in said fractional part register; and
   b. detecting means for producing a second control signal when the content of said fractional part register has reached a predetermined level as said content is subtracted by said subtracting circuit.

4. An electric shutter control device according to claim 3, wherein said detecting means consists of an OR gate connected to said register means.

5. An electric shutter control device comprising:
   a. a light measuring circuit for converting the intensity of light into a first electric signal corresponding to the logarithm of said intensity;
   b. an analog-to-digital converter for converting said first electrical signal to a digital code signal of $n$ bits, wherein $n$ is an integer;
   c. register means including an integral part register which stores an integral part of said digital signal of $n$ bits and a fractional part register which stores a fractional part of the digital signal of $n$ bits;
   d. a frequency divider for forming a plurality of first control signals having frequencies differentiated from each other by a multiplier $1/2k$, wherein $k$ is an integer;
   e. a selecting circuit responsive to the content in the integral part register for selecting one of said first control signals from said frequency divider;
   f. a substracting circuit for subtracting the content stored in the fractional part register in response to said first control signal selected by said selecting circuit;
   g. detecting means having input terminals respectively connected to output terminals of said fractional part register upon attainment of the content of said fractional part register to a predetermined level for producing a second control signal; and
   h. shutter control means responsive to said second control signal from said detecting circuit for closing the shutter.

6. An electric shutter control device according to claim 5, wherein said frequency divider includes a plurality of cascade-connected flip-flip circuits.

7. An electric shutter control device according to claim 6, further including gate means for applying a reference signal with a predetermined frequency to a first stage of said divider.

8. An electric shutter control device comprising:
   a. a shutter speed selector;
   b. an encoder adapted for operative association with the shutter speed selector and generating a digital signal of $n$ is an integer;
   c. register means consisting of an integral part register which stores an integral part of said digital signal of $n$ bits and a fractional part register which stores a fractional part of the digital signal of $n$ bits;
   d. a frequency divider for forming a plurality of first control signals having frequencies differentiated from each other by a multiplier $1/2k$, wherein $k$ is an integer;
   e. a selecting circuit responsive to the content of said integral part register for selecting one of said control signals from said frequency divider;
   f. a detecting circuit connected to said selecting circuit and said register means for detecting the content of the fractional part register and producing a second control signal when a predetermined relationship obtains between the number of pulses of the first control signal and the content of the fractional part register; and g. shutter control means responsive to the second control signal from said detecting circuit for controlling the period of actuation of the shutter.

9. An electric shutter control device comprising:
   a. register means, for storing a shutter speed in the form of a digital signal, the register means including an integral part register which stores an integral part of shutter speed information and a fractional part register which stores a fractional part of the shutter speed information;
   b. a frequency divider for forming a plurality of first control signal having frequencies differentiated from each other by a multiplier $1/2k$, wherein $k$ is an integer;
   c. a selecting circuit responsive to the content of said integral part register for selecting one of said control signals from said frequency divider;
   d. a detecting circuit connected to said selecting circuit and said register means for detecting the content of the fractional part register and producing a second control signal when there obtains a predetermined relationship between the number of pulses of the first control signal and the content of the fractional part register; and
   e. shutter control means responsive to the second control signal from said detecting circuit for controlling the period of actuation of the shutter.

* * * * *